(12) United States Patent
Arimoto et al.

(10) Patent No.: US 11,318,818 B2
(45) Date of Patent: May 3, 2022

(54) WINDOW REGULATOR WITH POWER SUPPLY CONNECTION FOR ELECTRICAL DEVICE ON MOVABLE GLASS

(71) Applicant: HI-LEX CONTROLS, INC., Rochester Hills, MI (US)

(72) Inventors: Shigeki Arimoto, Bloomfield Hills, MI (US); Yohei Moriya, Rochester Hills, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 106 days.

(21) Appl. No.: 16/774,412

(22) Filed: Jan. 28, 2020

(65) Prior Publication Data

US 2020/0262273 A1   Aug. 20, 2020

Related U.S. Application Data

(60) Provisional application No. 62/806,390, filed on Feb. 15, 2019.

(51) Int. Cl.
| | |
|---|---|
| *E05F 11/48* | (2006.01) |
| *B60J 1/17* | (2006.01) |
| *B60J 1/00* | (2006.01) |

(52) U.S. Cl.
CPC .............. *B60J 1/17* (2013.01); *B60J 1/007* (2013.01); *E05F 11/483* (2013.01); *E05Y 2201/654* (2013.01); *E05Y 2201/66* (2013.01); *E05Y 2900/55* (2013.01)

(58) Field of Classification Search
CPC .. B60J 1/17; B60J 1/007; E05F 11/483; E05F 15/689; E05Y 2201/66; E05Y 2201/654; E05Y 2900/55; E05Y 2400/654

USPC ........................................... 49/352, 358
See application file for complete search history.

(56) References Cited

U.S. PATENT DOCUMENTS

| | | | | |
|---|---|---|---|---|
| 2,293,968 | A | * | 8/1942 | Chandler ............... H01H 51/12 335/177 |
| 2,336,530 | A | * | 12/1943 | Chandler ............... E05F 15/689 49/349 |
| 4,167,834 | A | * | 9/1979 | Pickles ................. E05F 15/689 49/349 |
| 4,182,078 | A | * | 1/1980 | Bartholomew ....... E05F 11/405 49/140 |

(Continued)

*Primary Examiner* — Jerry E Redman
(74) *Attorney, Agent, or Firm* — Dickinson Wright PLLC; Steven L. Oberholtzer; Sungwook Lee (57) ABSTRACT

A window regulator for a motor vehicle door assembly including features for providing defrosting capabilities for movable glass of the door. A door wire harness is routed inside a door inner cavity. A defroster wire harness is provided having a first end connected to the door wire harness at a bracket on a window regulator guide rail. The opposite end of the defroster wire harness is affixed to a second bracket at a window regulator window carrier. Electrical defroster element wires are connected to the defroster wire harness at the second connector. The defroster wire harness is configured to undergo a bending motion in a manner to reduce fatigue and interference with internal components of the vehicle door. Other applications include providing electrical power to electronic or electrical elements carried by a vehicle movable window panel in addition to defroster functions.

12 Claims, 6 Drawing Sheets

(56) References Cited

U.S. PATENT DOCUMENTS

| | | | | |
|---|---|---|---|---|
| 4,235,117 A * | 11/1980 | Pickles | ................ | E05F 15/689 49/325 |
| 4,389,818 A * | 6/1983 | Sakamoto | ................. | B60J 1/17 49/349 |
| 4,939,867 A * | 7/1990 | Harada | ................ | E05F 15/689 49/349 |
| 4,967,510 A * | 11/1990 | Torii | ..................... | E05F 15/689 49/349 |
| 4,970,827 A * | 11/1990 | Djordjevic | ............ | E05F 11/488 49/349 |
| 5,309,677 A * | 5/1994 | Kunert | ................. | E05F 11/405 49/349 |
| 5,537,782 A * | 7/1996 | Klippert | ................ | E05F 15/689 49/358 |
| 5,806,244 A * | 9/1998 | Tilli | ...................... | E05F 11/423 49/349 |
| 6,073,395 A * | 6/2000 | Fenelon | ................ | E05F 15/689 185/40 R |
| 6,216,394 B1 * | 4/2001 | Fenelon | ................ | E05F 15/689 49/349 |
| 6,389,753 B1 * | 5/2002 | Fenelon | ................ | E05F 11/423 185/40 R |
| 6,430,874 B1 * | 8/2002 | Korte | ........................ | B60J 1/17 49/358 |
| 6,820,369 B2 * | 11/2004 | Fenelon | ................ | E05F 11/385 464/93 |
| 7,739,837 B2 * | 6/2010 | Suzuki | ................... | H02G 11/00 49/351 |
| 9,771,746 B2 * | 9/2017 | Costigan | ................ | E05F 11/485 |
| 10,038,314 B2 * | 7/2018 | Satou | ................... | B60R 16/0215 |
| 10,427,504 B2 * | 10/2019 | Mueller | ................. | E05F 15/60 |
| 10,472,876 B2 * | 11/2019 | Shimizu | ................ | E05F 11/481 |
| 2001/0052203 A1 * | 12/2001 | Doshita | ............... | B60R 16/0215 49/502 |
| 2006/0042167 A1 * | 3/2006 | Dedrich | ................ | E05F 11/423 49/358 |
| 2006/0059782 A1 * | 3/2006 | Garcia | ................ | B60R 16/0215 49/358 |
| 2006/0207183 A1 * | 9/2006 | Hiramatsu | ............ | E05F 15/689 49/358 |
| 2007/0056218 A1 * | 3/2007 | Fassbender | ........... | E05F 15/689 49/358 |
| 2009/0064591 A1 * | 3/2009 | Keller | ..................... | E05B 85/08 49/358 |
| 2009/0113802 A1 * | 5/2009 | Cicala | ................... | B60J 1/1861 49/358 |
| 2009/0178340 A1 * | 7/2009 | Noritsugu | ........... | B60R 16/0215 49/358 |

\* cited by examiner

FIG. 1

Fig. 2 (C) Full Down

Fig. 2 (b) Mid Stroke

Fig. 2 (a) Full Up

WINDOW REGULATOR WITH POWER SUPPLY CONNECTION FOR ELECTRICAL DEVICE ON MOVABLE GLASS

CROSS REFERENCE TO RELATED APPLICATIONS

This application claims the benefit of U.S. Provisional Patent Application No. 62/806,390 filed Feb. 15, 2019, the content of which is hereby incorporated by reference in its entirety.

TECHNICAL FIELD

This invention relates to motor vehicle component and particularly to a window regulator for controlling the motion of side door glass and providing a connection to the glass for an electrical element such as a resistance defogger element, or other electrical or electronic device.

BACKGROUND

The statements in this section merely provide background information related to the present disclosure and may not constitute prior art.

In order to reduce the collection of frost, ice or condensate on window surfaces in motor vehicles, defogger or defroster systems are in widespread use. With the exception of defrosters for front windshields, the most common implementation is provided by embedding electrical resistance conductors within the glass or other glazing panel. Electrical current passing through the conductors in the form of discrete wires, printed conductive ink traces or a thin transparent film produces heat which melts ice and helps to vaporize collected condensate. For purposes of this application, devices for defogging, deicing or defrosting will be collectively referred to as defroster devices. Most available motor vehicles in the US and other regions include defroster devices embedded in rear glass panel such as rear window or hatchback glass. Outside rearview mirrors also increasingly incorporate such elements. These systems are effective in enhancing visibility for vehicle drivers and occupants and have a positive effect on motor vehicle safety.

There is a need to improve visibility through other window panels of motor vehicles in addition to the rear windows. Providing defroster capabilities for side door glass could provide significant benefits. One difficulty in providing such features relates to the need for side door glass to typically be movable between open and closed, up and down positions. Conducting electrical current to the movable glass poses design challenges.

Side door glass motion is controlled by devices known as window regulators. Various designs are known. In a popular configuration, an elongated guide rail is provided mounted inside a door inner panel having a window carrier which clamps to a bottom edge of a glass (typically) window panel. A manual or motor driven cable system is provided for moving the window carrier along the guide rail which then moves the window panel between positions in a desired manner. Glass run channels are typically provided at the forward and rearward edges of the window panel, together with upper and lower weatherstrip guides, stabilize and seal the window panel against the external environment when the glass is in the closed position.

In view of the foregoing, embodiments the present invention provide designs for window regulators incorporating features for allowing a physical and electrical connection between a door wire harness and a defroster wire harness, allowing electrical current to be conducted to embedded electrical conductors.

The features of the present invention may also be embodied in systems having an electrical connection to a window panel used for purposes outside of a defroster function. As examples of such electrical connections could be used for powering electrical or electronic devices such as displays, sensors, antennas, etc.

SUMMARY

The present disclosure is related to a window regulator assembly for a door assembly for a motor vehicle. The window regulator for guiding a window panel between movable positions includes the window panel having an internal electrically conductive element for providing an electrical or electronic function, and the elements including electrical connection element lead wires. The window regulator further includes a door wire harness and an electrical element wire harness. The electrical element wire harness is connected at a first end to a guide rail of the window regulator, and at a second end to a movable window carrier element of the window regulator. In addition, the window regulator includes a first bracket at the wire harness first end adapted for connection with the door wire harness, and a second bracket at the wire harness second end adapted for connection to the element lead wire.

According to a further aspect of the present disclosure, the first bracket is mechanically affixed to the guide rail, and functions as a cable guide for a cable driven along the guide rail and coupled to the window carrier for controlling movement of the window carrier. In addition, the first bracket positions the first end on a first side thereof and the cable on a second opposite side thereof. The first bracket supports an electrical connector.

According to a further aspect of the present disclosure, the wire harness second end is connected to the window carrier by a second bracket and the second bracket includes an electrical connector for enabling connection between the element wire harness and the element lead wires.

According to a further aspect of the present disclosure, the element wire harness is formed of a wire positioned to undergo a bending motion as the window carrier moves between positions along the guide rail. The element wire harness is formed of a flattened configuration such that bending of the element wire harness occurs generally within a vertical fore-aft plane relative to the vehicle when undergoing the bending motion. In addition, the element wire harness is overmolded with a rubber like material.

According to a further aspect of the present disclosure, the electrical element is in the form of a defroster for the door window and is in the form of at least one of a switch, a sensor, a display, a variable tinting mechanism, or an antenna for the door window.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIGS. 2(a, b and c) show side views of an exemplary window regulator with the window carrier in respectively, upper, middle and full down positions.

FIGS. 6(a, b, and c) are views showing various connections between wire elements and the window regulator.

FIGS. 9(a and b) show a window regulator in accordance with the present invention having an external motor drive unit.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
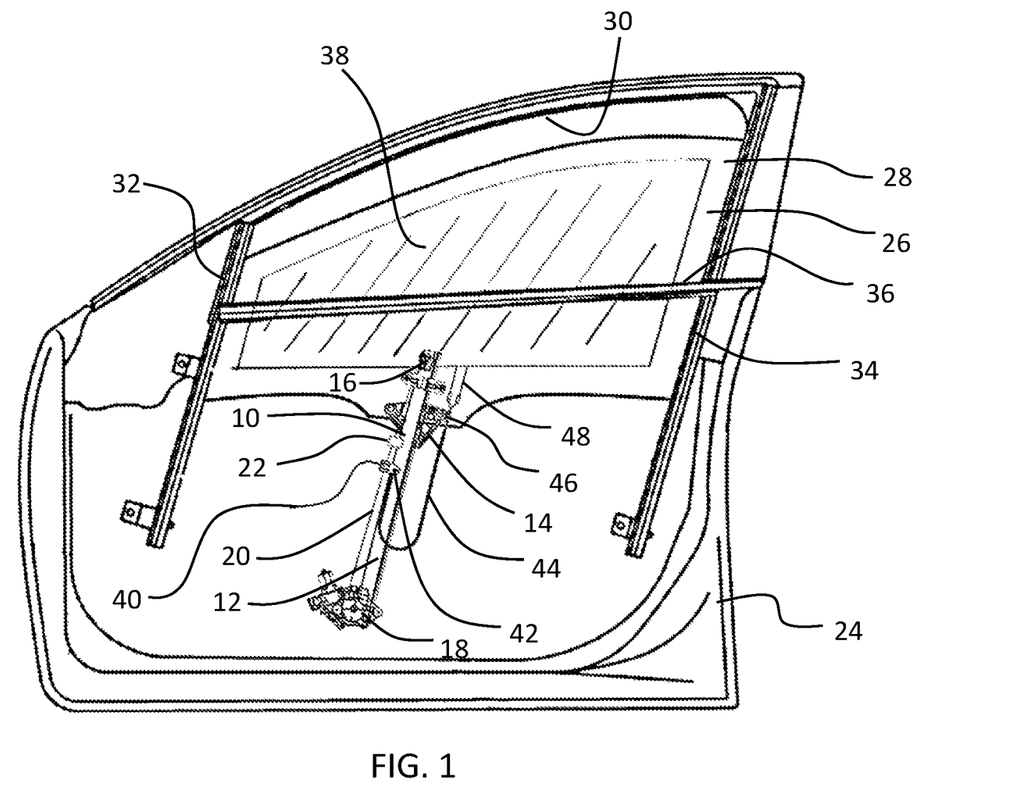
FIG. 1 is a side pictorial view of an automotive door incorporating movable glass, a window regulator and features for conducting electrical current to the glass defroster in accordance with an embodiment of the present invention.

With reference to FIG. 1, a window regulator assembly 10 is illustrated, which includes as principal components; guide rail 12, window carrier 14, cable deflector 16 such as a cable slider or a pulley, motor drive assembly 18, drive cable 20, and cable guide 22. The guide rail 12 may be formed of sheet-metal using a forming or rolling process or as an extrusion or plastic molding. The window carrier 14 is caused to travel up and down along the guide rail 12 and includes a window clamp arrangement (not illustrated) which attaches to the lower edge of the vehicle side door glass (not illustrated).

The cable deflector 16 is positioned at the top of the guide rail 12 and acts to redirect and tension the drive cable 20. The motor drive assembly 18 positioned at the bottom of the guide rail 12 is actuated and powered electrically to move the drive cable 20. The drive cable 20 wraps around the cable deflector 16 and wraps around a pulley within the motor drive assembly 18 where it is driven. Ends of the drive cable 20 may terminate at attachment points on the window carrier 14. The drive cable 20 spans the entire length of the guide rail 12. A cable guide 22 in accordance with the present invention is attached to the guide rail 12 to support the drive cable 20 to reduce noise and rattle caused by vibration of the drive cable 20. The motor drive assembly 18 is affixed to the bottom of the guide rail 12 but could be positioned at other locations, depending on application requirements. Similarly, the cable deflector 16 is shown at the top of the guide rail 12 but may be implemented in various other positions depending on the application. The cable guide 22 is attached to the guide rail 12 at a position along the length of the guide rail 12 between the motor drive assembly 18 and the cable deflector 16. The window regulator assembly 10 is shown as a single rail type system. Alternate implementations may use a pair of separated guide rails provided for better control of the movable glass or other window panel.

Window regulator 10 is shown installed within a motor vehicle side door 24 forming glass opening 26. Window panel 28 is generally formed of glass, although other types of glazing material such as a polycarbonate could be used. Window panel 28 is movable between upper and lower positions through actuation of window regulator 10. In its closed position, window panel 28 seals against upper weatherstrip 30, at its sides along front and rear run channels 32 and 34, and is sealed at its lower edge through belt line weatherstrip 36.

Window panel 28 in accordance with the present invention includes internally disposed electrically conductive element in the form of discrete wires, foil, printed conductive ink traces or in a preferred embodiment, a semi transparent film which does not adversely impact visibility through the window panel. These alternatives arrangements are referred to here collectively as an element 38 which conducts electricity and through electrical resistance produces heat for performing the defogging and defrosting functions. In order to operate, it is necessary to provide electrical conductors communicating with element 38.

A first wire harness such as a door wire harness 40 communicates with an electrical bus within the associated motor vehicle body and is controlled by suitable switching devices, circuit protection devices etc. Typically, wiring that communicates with a door which moves between open and closed positions passes through a flexible connector conduit located at the front hinge pillar of the vehicle door opening. In this embodiment, a termination end of door wire harness 40 is mechanically attached to guide rail 12 at bracket 42. A second wire harness such as a defroster wire harness (an electrical element wire harness) 44 connects with door wire harness 40 at bracket 42 and is mounted at its opposite end to window carrier bracket 46 which in turn is connected to element lead wires 48. Since defogger wire harness 44 needs to stay in connection with the brackets 42 and 46 it must be capable of undergoing deflection over the range of travel of window carrier 14. Additional figures referenced below describe in more detail the connections, routing and mounting of defroster wire harness 44.

Figure 2:
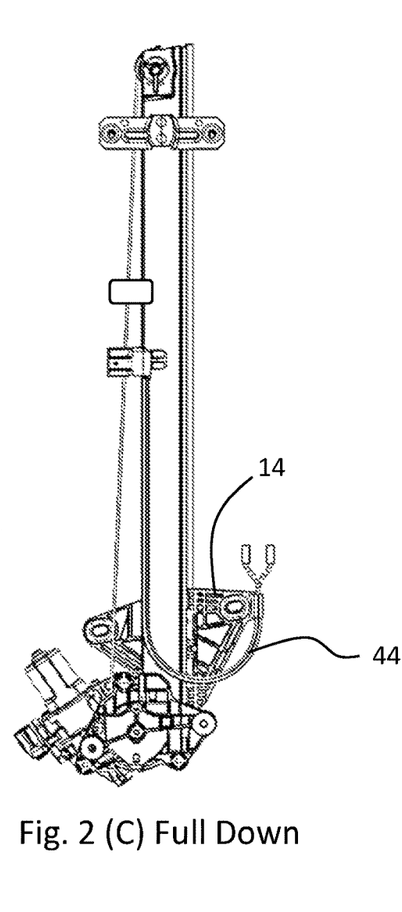

FIG. 2 provide additional details of window regulator 10 and show in more detail a wire connection 1 at window carrier bracket 46 and wire connection 2 at bracket 42. FIGS. 2(a, b, and c) illustrate the movement of defroster wire harness 44 in various positions of window carrier 14 and the associated window panel 28. In FIG. 2(a) window carrier 14 is shown in the full up position. It is noted that the defroster wire harness 44 assumes a gentle bend or curved configuration in this figure. FIG. 2(b) shows window carrier 14 in a middle position. FIG. 2(c) shows the assembly when the window carrier 14 is in the full down position. These positions of window carrier 14 show the manner of bending of defroster wire harness 44 with movement of window carrier 14, in which the wire harness assumes a generally "J" shaped bend throughout its range of motion. It is important that the bending of wire harness 44 occurs in a predictable, smooth manner which reduces fatigue damage to the assembly and controls its position so as not to interfere with other components within the door inner compartment area. In one preferred embodiment, defroster wire harness 44 is formed of a flat conductor (flattened shape) that will tend to bend and deflect within a vertical plane inside of door 24 and assume the shapes generally described above. In accordance with other form of the present disclosure, the defroster wire harness 44 may be formed of a round conductor, which will tend to bend like the flat conductor.

Figure 3:
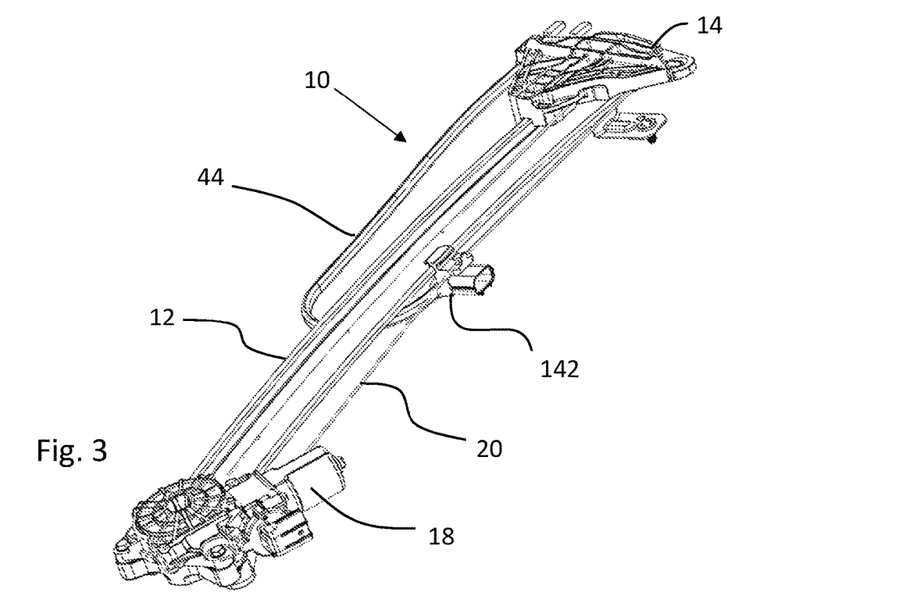
FIG. 3 is pictorial view of a window regulator.

FIG. 3 shows further details of window regulator 10. This figure shows window regulator 10 as it might be provided as a subassembly for later connection to door wire harness 40 and element lead wires 48. Here bracket 142 is shown attached to guide rail 12 and can be provided in the form of a molded part. These figures further illustrate that bracket 142 differs from bracket 42 in that it provides a dual function by being integrated with and functions as a cable guide 22. Thus bracket 142 is provided to guide cable 20 and to reduce the occurrence of cable vibration which can give rise to undesirable noise within the door assembly and also performs the function of being a mounting location for a connection between defroster wire harness 44 and door wire harness 40. Bracket 142 can be attached to guide rail 12 by various approaches including interlocking connections or mechanical connectors such as a so-called metal formed TOX type connector. In a similar manner as shown by this figure, the opposite end of defroster wire harness 44 is mounted in a fixed manner to window carrier 14 and provides exposed leads or connectors for connection with element lead wires 48.

Figure 4:
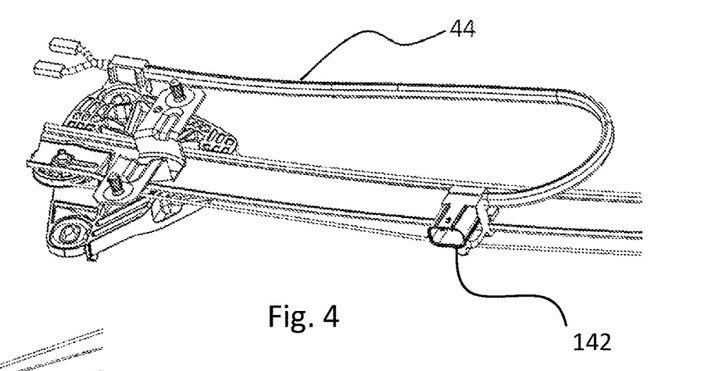
FIG. 4 is an enlarged view of the connection between a defroster wire harness and a window regulator.
Figure 5:
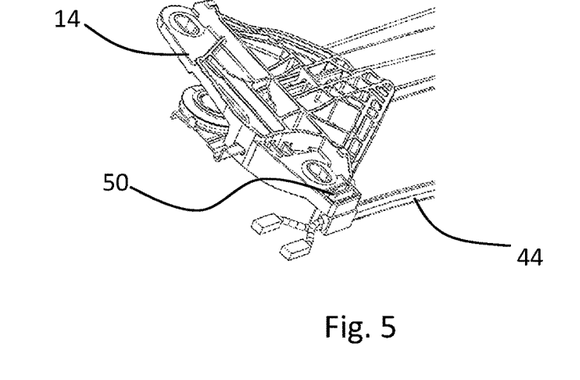
FIG. 5 is an enlarged view of the window carrier showing the wire connection.

FIG. 4 shows an enlargement of defroster wire harness 44 showing that in order to provide the desired controlled path of motion during movement of window carrier 14 the wire can be over molded by a rubber-like material to provide the controlled bending movement and to reduce the radius of bends of the wire for reducing the likelihood of fatigue failure. The provision of the rubber like over molded material also provides a sound deadening function to reduce undesirable buzz, squeak and rattle (BSR) problems associated with movement and vibration of defroster wire harness 44. FIG. 5 shows an enlargement of the connection at the upper end of wire harness 44 and illustrates that a separate molded clip component 50 can be provided for attachment to a suitable aperture or other receiving feature of window carrier 14.

Figure 6:
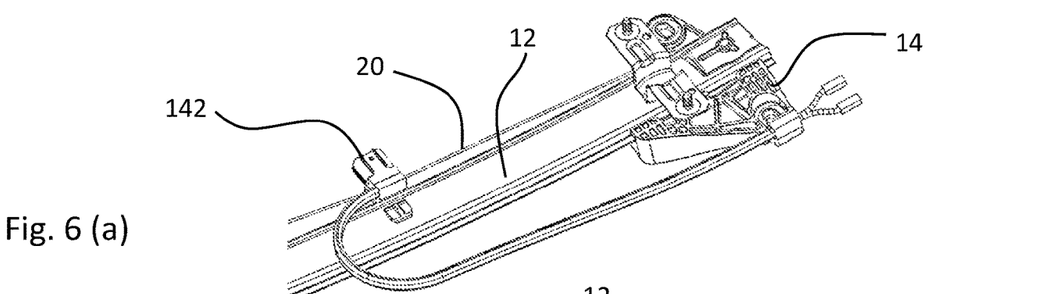
Figure 7:
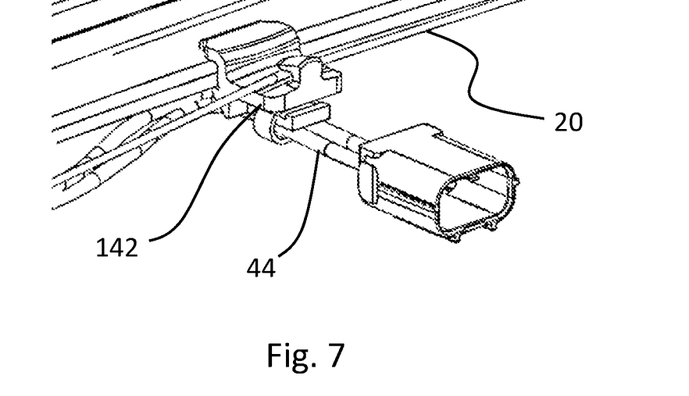
FIG. 7 is an enlarged view of an embodiment of a wire connection with the window regulator.

FIGS. 6(a, b and c) show various alternative embodiments for designs of connections between wire harness 44 and guide rail bracket 142. In FIG. 6(a) this connection is made as previously illustrated with bracket 142 performing the dual function of harness attachment and cable guide. In FIG. 6(b) a modified form of bracket 142 mounts an end of harness 44 but has an extending lead with electrical conductors terminating at wire connector 52 which has integrated features for snap fitting or otherwise attaching to guide rail 12. The embodiment of FIG. 6(c) differs from the prior embodiments in that connector 52 does not directly attached to guide rail 12 but rather a separate attachment clip 54 is provided for that function. FIG. 7 shows an approach to avoiding interference between the electrical conductors of harness 44 and cable 20, which when moved could cause abrasion damage to the electrical conductors. As shown by that figure, bracket 142 guides cable 20 along one surface whereas electrical conductors of harness 44 are positioned on an opposite surface of the cable guide.

Figure 8:
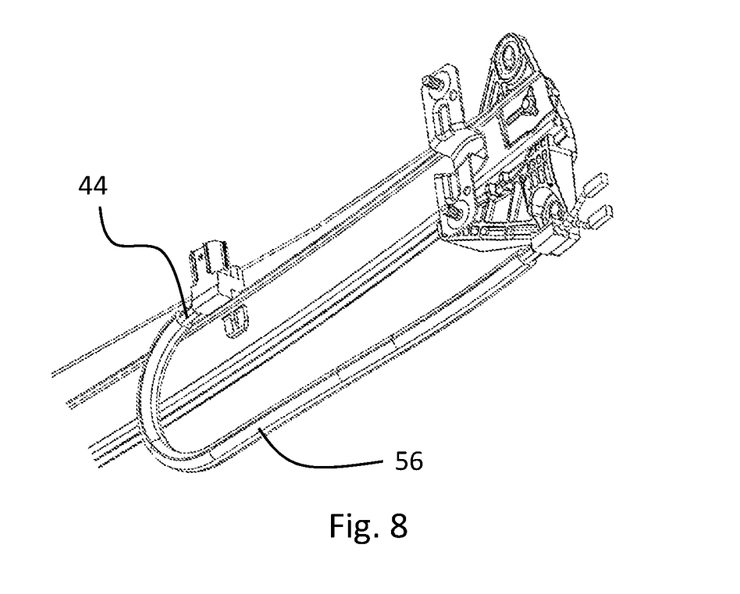
FIG. 8 is a side view showing the window regulator in accordance with an embodiment of the present invention.

FIG. 8 illustrates a further alternate embodiment in which foam pad 56 is attached around harness 44 to reduce BSR problems and further acts as a mechanical mechanism for controlling the bending behavior of wire harness 44. The use of foam pad 56 may be an alternative to or in addition to harness 44 formed with the over molded rubber-like material as illustrated in FIG. 4. In another approach, flock is coated with an adhesive around the wire harness 44, such as a flocking process for reducing BSR problems and controlling bending behavior of the wire harness. In the embodiment shown in FIG. 8, like those shown in FIGS. 1, and 2(a, b and c), the functions of the cable guide 22 and bracket 42 are provided by separate components.

Figure 9:
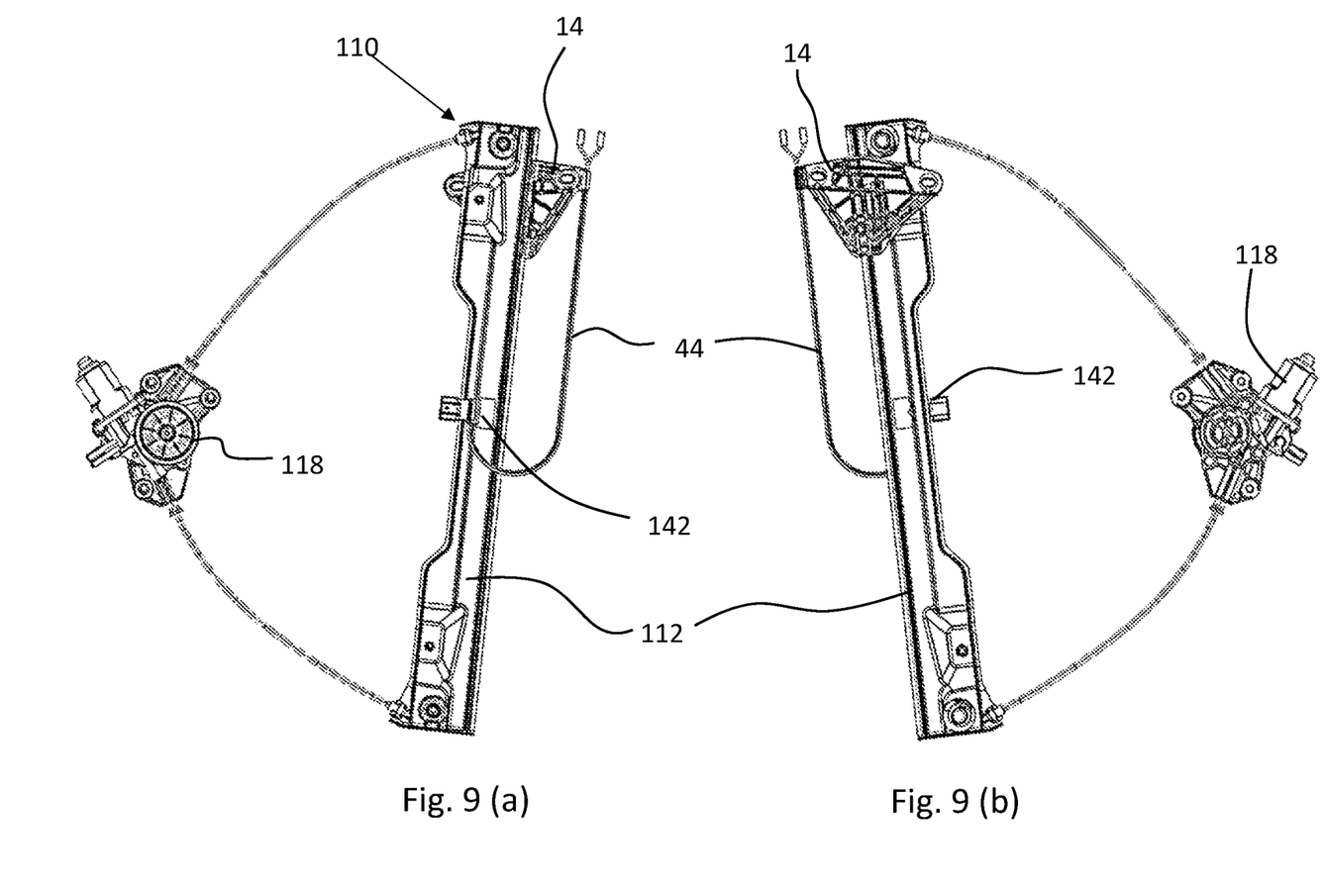

FIGS. 9(a and b) illustrate an alternate embodiment of window regulator 110 which differs from window regulator 10 in that motor drive 18 is separated from guide rail 12 and is instead separately mounted. In this case, motor drive 118 communicates with guide rail 112 via sheathed drive cable segments 158 and 160. However, guide rail 112 provides the function mentioned previously of enabling power to be conducted to element lead wires 48.

Various window regulators configurations are in widespread use today. The previous embodiments illustrate a single rail type system. Dual rail systems are also in common use. Moreover, as previously noted, motor drive units can be directly affixed to or separate from one or more guide rails. The features of the present invention may be used with these various window regulator implementations.

The above description describes an application of the present invention for use with a defroster element. However, there are numerous other potential applications where there is a desire to provide an electrical connection to a movable window panel. For example, electrical components and functions may be integrated into the window such as displays, sensors, switches, variable tinting and antennas. For these devices, an electrical connection utilizing the features of the defroster wire harness and related features could be provided. Furthermore, it is not necessary that the wire harness provided for a defroster function or any other function necessarily has a physical connection with the window regulator itself.

While the above description constitutes the preferred embodiments of the present invention, it will be appreciated that the invention is susceptible to modification, variation and change without departing from the proper scope and fair meaning of the accompanying claims.

What is claimed is:

1. A window regulator assembly for guiding a window panel between movable positions in a motor vehicle having a door assembly, the window regulator assembly comprising,
   the window panel having an internal electrically conductive element for providing an electrical or electronic function, the internal electrically conductive element including electrical connection element lead wires,
   a first wire harness such as a door wire harness attached to a guide rail,
   a second wire harness such as an electrical element wire harness, the electrical element wire harness connected at a first end to the guide rail of the window regulator assembly, and at a second end to a movable window carrier of the window regulator assembly,
   a first bracket at the first end of the electrical element wire harness releasably connecting with the door wire harness, and
   a second bracket at the second end of the electrical element wire harness connecting to the element lead wires.

2. The window regulator assembly in accordance with claim 1 further comprising, the first bracket is mechanically affixed to the guide rail.

3. The window regulator assembly in accordance with claim 2 further comprising, the first bracket further functions as a cable guide for a cable driven along the guide rail and coupled to the window carrier for controlling movement of the window carrier.

4. The window regulator assembly in accordance with claim 2 further comprising, the first bracket positions the first end of the electrical element wire harness on a first side of the first bracket and guides a cable on a second opposite side of the first bracket.

5. The window regulator assembly in accordance with claim 1 further comprising, the first bracket supports an electrical connector.

6. The window regulator assembly in accordance with claim 1 further comprising, the second end of the electrical element wire harness is connected to the window carrier by the second bracket.

7. The window regulator assembly in accordance with claim 6 further comprising, wherein the second bracket includes an electrical connector for enabling connection between the element wire harness and the element lead wires.

8. The window regulator assembly in accordance with claim 1 further comprising, the element wire harness is formed of a wire positioned to undergo a bending motion as the window carrier moves between positions along the guide rail.

9. The window regulator assembly in accordance with claim 8 further comprising, the element wire harness is formed of a flattened configuration such that bending of the element wire harness occurs generally within a vertical fore-aft plane relative to the vehicle when undergoing the bending motion.

10. The window regulator assembly in accordance with claim 8 further comprising, the element wire harness is overmolded with a material such as a rubber.

11. The window regulator assembly in accordance with claim 1 further comprising, the electrical element is in a form of a defroster for the door window.

12. The window regulator assembly in accordance with claim 1 further comprising, the electrical element is in a form of at least one of a switch, a sensor, a display, a variable tinting mechanism, or an antenna for the door window.

* * * * *